United States Patent
Bloomberg et al.

(10) Patent No.: US 6,257,698 B1
(45) Date of Patent: Jul. 10, 2001

(54) METHOD OF INK JET PRINTING WITH VARYING DENSITY MASKING PRINTING AND WHITE SPACE SKIPPING FOR FASTER PAPER ADVANCEMENT

(75) Inventors: Steven Jay Bloomberg, Mendon; Yonglin Xie, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/349,025

(22) Filed: Jul. 7, 1999

(51) Int. Cl.$^7$ ........................................................ B41J 2/15
(52) U.S. Cl. .................................. 347/40; 347/15; 347/43
(58) Field of Search ................................. 347/40, 43, 41, 347/14, 15

(56) References Cited

U.S. PATENT DOCUMENTS

| | | | |
|---|---|---|---|
| 4,833,491 | * | 5/1989 | Rezanka ................................. 347/43 |
| 5,428,377 | * | 6/1995 | Stoffel et al. .......................... 347/43 |
| 5,600,353 | | 2/1997 | Hickman et al. ...................... 347/43 |
| 5,714,990 | * | 2/1998 | Courtney ............................... 347/14 |
| 5,821,957 | * | 10/1998 | Berge et al. ........................... 347/43 |
| 5,923,349 | * | 7/1999 | Meyer ................................... 347/43 |

\* cited by examiner

*Primary Examiner*—N. Le
*Assistant Examiner*—Lamson D. Nguyen
(74) *Attorney, Agent, or Firm*—Perman & Green, LLP

(57) ABSTRACT

A method of printing on a print medium with an ink jet printing mechanism having a print head with at least two nozzle arrays. The method comprising steps of printing with the nozzle arrays in a first printing mode, the first printing mode comprising the at least two nozzle arrays printing during a pass of the print head relative to the print medium, a second one of the nozzle arrays printing with a first density masking such that a portion of nozzles of the second nozzle array are prevented from printing during the pass; and switching to printing in a second printing mode when a subsequent pass of the print head relative to the print medium does not require printing from the first nozzle array, the second printing mode comprising the second nozzle array printing without the first density masking during the subsequent pass.

22 Claims, 17 Drawing Sheets

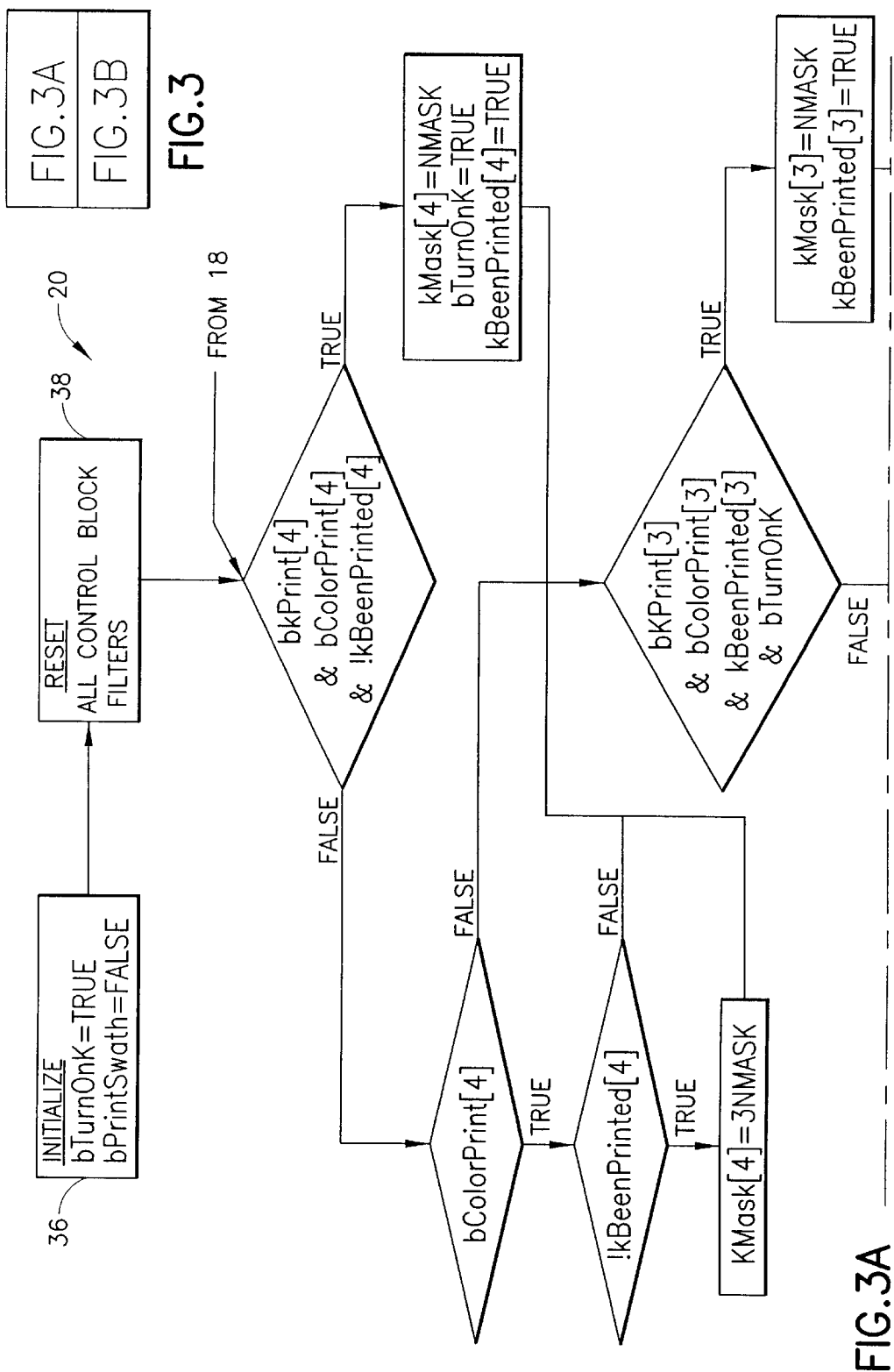

FIG.5A

| SEGMENT SWATH & HEAD ADVANCEMENT | CONTENT | | | | | | | | |
|---|---|---|---|---|---|---|---|---|---|
| | | 0 | | | | | | | |
| | | 0 | 0 | 0 | | | | | |
| | | 0 | 0 | 0 | 0 | 0 | | | |
| 1 | COLOR & BLACK | | 100 | 33_0 | 100 | 33_1 | 100 | 33_2 | |
| 2 | COLOR & BLACK | | | | 100 | 33_0 | 100 | 33_1 | 100 |
| 3 | COLOR & BLACK | | | | | | 100 | 33_0 | 100 |
| 4 | COLOR & BLACK | | | | | | | | 100 |
| 5 | COLOR & BLACK | | | | | | | | |
| 6 | BLACK | | | | | | | | |
| 7 | BLACK | | | | | | | | |
| 8 | BLACK | | | | | | | | |
| 9 | BLACK | | | | | | | | |
| 10 | BLACK | | | | | | | | |
| 11 | BLACK | | | | | | | | |
| 12 | BLACK | | | | | | | | |
| 13 | BLACK | | | | | | | | |
| 14 | BLACK | | | | | | | | |
| 15 | BLACK | | | | | | | | |
| 16 | BLACK | | | | | | | | |
| 17 | COLOR & BLACK | | | | | | | | |
| 18 | COLOR & BLACK | | | | | | | | |
| 19 | COLOR & BLACK | | | | | | | | |
| 20 | COLOR & BLACK | | | | | | | | |
| 21 | COLOR & BLACK | | | | | | | | |
| 22 | NONE | | | | | | | | |
| 23 | NONE | | | | | | | | |
| 24 | NONE | | | | | | | | |
| | PASS: | 1 | | 2 | | 3 | | 4 | |
| | | BLACK HEAD | COLOR HEAD | BLACK HEAD | COLOR HEAD | BLACK HEAD | COLOR HEAD | BLACK HEAD | COLOR HEAD |

| FIG.5A | FIG.5B | FIG.5C | FIG.5D |

FIG.5

|  |  |  |  |  |  |  |  |  |
|---|---|---|---|---|---|---|---|---|
| 33_2 | | | | | | | | |
| 33_1 | 100 | 33_2 | | | | | | |
| 33_0 | 100 | 33_1 | 100 | 33_2 | | | | |
| | 100 | 33_0 | 100 | 33_1 | 100 | 33_2 | | |
| | | | 0 | 33_0 | 0 | 33_1 | 0 | 33_2 |
| | | | | | 0 | 0 | 0 | 100 | 0 |
| | | | | | | | 0 | 100 | 0 |
| | | | | | | | | | 0 |

↑ AUTO-MODE SWITCH

| 5 | | 6 | | 7 | | 8 | | 9 | |
|---|---|---|---|---|---|---|---|---|---|
| BLACK HEAD | COLOR HEAD | BLACK HEAD | COLOR HEAD | BLACK HEAD | COLOR HEAD | BLACK HEAD | COLOR HEAD | BLACK HEAD | COLOR HEAD |

FIG.5B

| SEGMENT SWATH & HEAD ADVANCEMENT | CONTENT | | | | | | | | |
|---|---|---|---|---|---|---|---|---|---|
| 1 | COLOR & BLACK | | | | | | | | |
| 2 | COLOR & BLACK | | | | | | | | |
| 3 | COLOR & BLACK | | | | | | | | |
| 4 | COLOR & BLACK | | | | | | | | |
| 5 | COLOR & BLACK | | | | | | | | |
| 6 | BLACK | ADV.=312 | | | | | | | |
| 7 | BLACK | | | | | | | | |
| 8 | BLACK | | | ADV.=312 | | | | | |
| 9 | BLACK | 100 | | | | | | | |
| 10 | BLACK | 100 | 0 | | | ADV.=208 | | | |
| 11 | BLACK | 100 | 0 | | | | | | |
| 12 | BLACK | | 0 | 100 | | | | ADV.=104 | |
| 13 | BLACK | | | 100 | 0 | | | | |
| 14 | BLACK | | | 100 | 0 | 0 | | | |
| 15 | BLACK | | | | 0 | 100 | 0 | 0 | |
| 16 | BLACK | | | | | 33_0 | 0 | 33_1 | 0 |
| 17 | COLOR & BLACK | | | | | | 100 | 33_0 | 100 |
| 18 | COLOR & BLACK | | | | | | | | 100 |
| 19 | COLOR & BLACK | | | | | | | | |
| 20 | COLOR & BLACK | AUTO MODE SWITCH | | | | ↑ | | | |
| 21 | COLOR & BLACK | | | | | | | | |
| 22 | NONE | | | | | | | | |
| 23 | NONE | | | | | | | | |
| 24 | NONE | | | | | | | | |
| | PASS: | 10 | | 11 | | 12 | | 13 | |
| | | BLACK HEAD | COLOR HEAD | BLACK HEAD | COLOR HEAD | BLACK HEAD | COLOR HEAD | BLACK HEAD | COLOR HEAD |

FIG.5C

| | | | | | | | | | | | | |
|---|---|---|---|---|---|---|---|---|---|---|---|---|
| 33_2 | | | | | | | | | | | | |
| 33_1 | 100 | 33_2 | | | | | | | | | | |
| 33_0 | 100 | 33_1 | 100 | 33_2 | | | | | | | | |
| | 100 | 33_0 | 100 | 33_1 | 100 | 33_2 | | | | | | |
| | | 100 | 33_0 | 100 | 33_1 | 100 | 33_2 | | | | | |
| | | | 100 | 33_0 | 0 | 33_1 | 100 | 33_2 | | | | |
| | | | | | 0 | 0 | 0 | 0 | 0 | | | |
| | | | | | | | 0 | 0 | 0 | | | |
| | | | | | | | | | 0 | | | |

| 14 | | 15 | | 16 | | 17 | | 18 | | 19 | |
|---|---|---|---|---|---|---|---|---|---|---|---|
| BLACK HEAD | COLOR HEAD | BLACK HEAD | COLOR HEAD | BLACK HEAD | COLOR HEAD | BLACK HEAD | COLOR HEAD | BLACK HEAD | COLOR HEAD | BLACK HEAD | COLOR HEAD |

| SEGMENT SWATH & HEAD ADVANCEMENT | CONTENT | | | | | | | | |
|---|---|---|---|---|---|---|---|---|---|
| | | 0 | | | | | | | |
| | | 0 | | 0 | | | | | |
| | | 0 | | 0 | | 0 | | | |
| | | 0 | 0 | 0 | 0 | 0 | | 0 | |
| | | 0 | 0 | 0 | 0 | 0 | 0 | 0 | |
| | | 0 | 0 | 0 | 0 | 0 | 0 | 0 | 0 |
| | | 0 | 0 | 0 | 0 | 0 | 0 | 0 | 0 |
| 1 | COLOR & BLACK | | 50_ | | 50_ | 1/16_ | 50_ | 1/16_ | 50_ |
| 2 | COLOR & BLACK | | | | 50_ | | 50_ | 1/16_ | 50_ |
| 3 | COLOR & BLACK | | | | | | 50_ | | 50_ |
| 4 | COLOR & BLACK | | | | | | | | 50_ |
| 5 | COLOR & BLACK | | | | | | | | |
| 6 | COLOR & BLACK | | | | | | | | |
| 7 | COLOR & BLACK | | | | | | | | |
| 8 | COLOR & BLACK | | | | | | | | |
| 9 | COLOR & BLACK | | | | | | | | |
| 10 | BLACK | | | | | | | | |
| 11 | BLACK | | | | | | | | |
| 12 | BLACK | | | | | | | | |
| 13 | BLACK | | | | | | | | |
| 14 | BLACK | | | | | | | | |
| 15 | BLACK | | | | | | | | |
| 16 | BLACK | | | | | | | | |
| 17 | BLACK | | | | | | | | |
| 18 | BLACK | | | | | | | | |
| 19 | NONE | | | | | | | | |
| 20 | NONE | | | | | | | | |
| 21 | NONE | | | | | | | | |
| 22 | NONE | | | | | | | | |
| 23 | NONE | | | | | | | | |
| 24 | NONE | | | | | | | | |
| | PASS: | 1 | | 2 | | 3 | | 4 | |
| | | BLACK HEAD | COLOR HEAD | BLACK HEAD | COLOR HEAD | BLACK HEAD | COLOR HEAD | BLACK HEAD | COLOR HEAD |

| FIG.7A | FIG.7B | FIG.7C | FIG.7D | FIG.7 |

FIG.7B

| SEGMENT SWATH & HEAD ADVANCEMENT | CONTENT | | | | | | | | |
|---|---|---|---|---|---|---|---|---|---|
| 1 | COLOR & BLACK | | | | | | | | |
| 2 | COLOR & BLACK | | | | | | | | |
| 3 | COLOR & BLACK | 1/16_ | | | | | | | |
| 4 | COLOR & BLACK | 1/16_ | | 1/16_ | | | | | |
| 5 | COLOR & BLACK | 1/16_ | 50_ | 1/16_ | | 1/16_ | | | |
| 6 | COLOR & BLACK | 1/16_ | 50_ | 1/16_ | 50_ | 1/16_ | | 1/16_ | |
| 7 | COLOR & BLACK | 1/16_ | 50_ | 1/16_ | 50_ | 1/16_ | 50_ | 1/16_ | |
| 8 | COLOR & BLACK | 1/16_ | 50_ | 1/16_ | 50_ | 1/16_ | 50_ | 1/16_ | 50_ |
| 9 | COLOR & BLACK | | 50_ | 1/16_ | 50_ | 1/16_ | 50_ | 1/16_ | 50_ |
| 10 | BLACK | | 0 | | 0 | 0 | 0 | 0 | 0 |
| 11 | BLACK | | | | 0 | | 0 | 0 | 0 |
| 12 | BLACK | | | | | | 0 | | 0 |
| 13 | BLACK | | AUDIO MODE SWITCH | | | | | | 0 |
| 14 | BLACK | | | | | | | | |
| 15 | BLACK | | | | | | | | |
| 16 | BLACK | | | | | | | | |
| 17 | BLACK | | | | | | | | |
| 18 | BLACK | | | | | | | | |
| 19 | NONE | | | | | | | | |
| 20 | NONE | | | | | | | | |
| 21 | NONE | | | | | | | | |
| 22 | NONE | | | | | | | | |
| 23 | NONE | | | | | | | | |
| 24 | NONE | | | | | | | | |
| | PASS: | 10 | | 11 | | 12 | | 13 | |
| | | BLACK HEAD | COLOR HEAD | BLACK HEAD | COLOR HEAD | BLACK HEAD | COLOR HEAD | BLACK HEAD | COLOR HEAD |

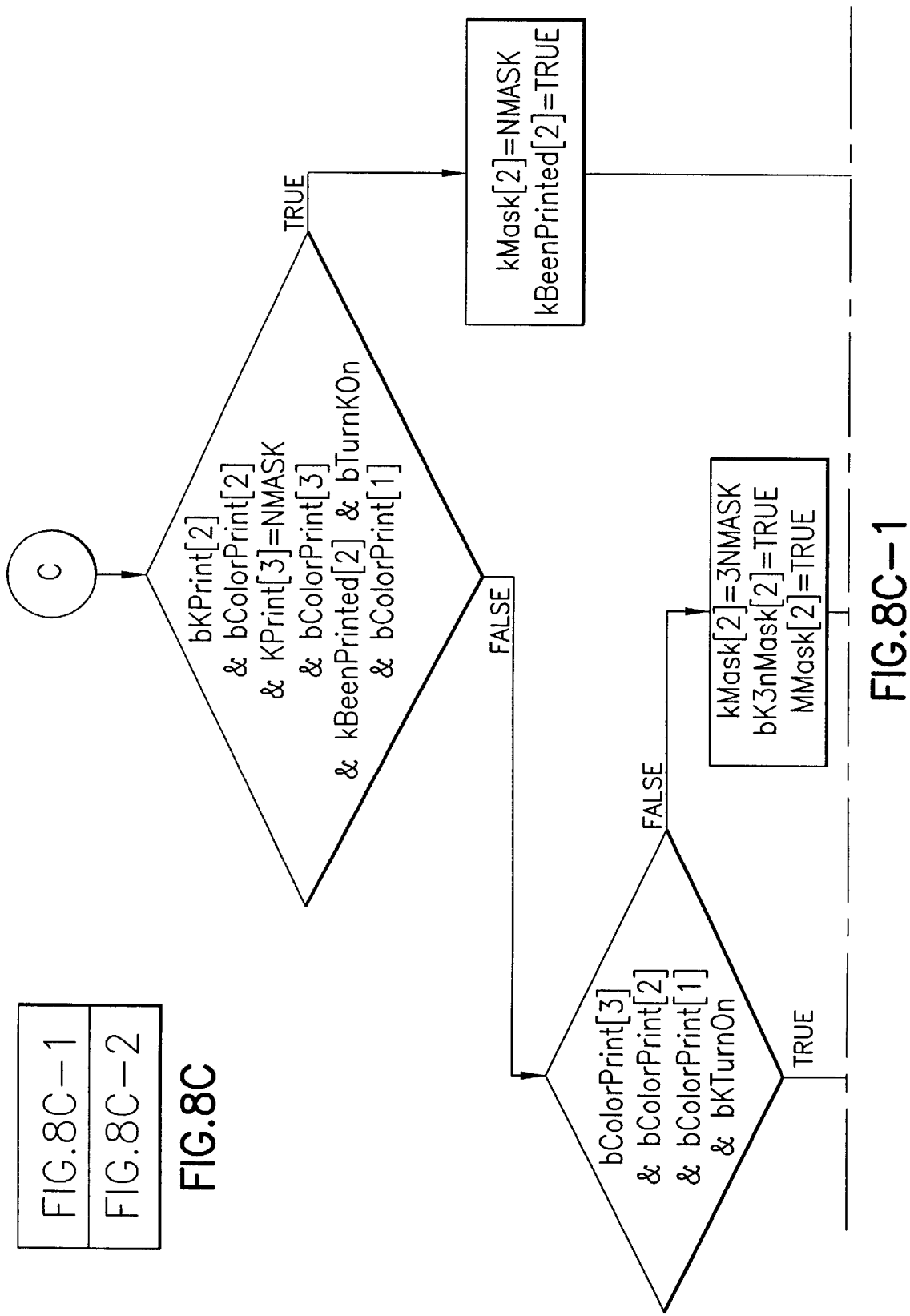

METHOD OF INK JET PRINTING WITH
VARYING DENSITY MASKING PRINTING
AND WHITE SPACE SKIPPING FOR FASTER
PAPER ADVANCEMENT

BACKGROUND OF THE INVENTION

1. Field of the Invention

The present invention relates to ink jet printing and, more particularly, to printing in different density masking printing modes.

2. Prior Art

U.S. Pat. No. 5,600,353 discloses an apparatus and method of transitioning between ink jet printing modes. Two different sheet advancement distances are disclosed. Shingling using reduced percentage print densities is also disclosed.

SUMMARY OF THE INVENTION

In accordance with one method of the present invention, a method of printing on a print medium with an ink jet printing mechanism having a print head with at least two nozzle arrays is provided. The method comprising steps of printing with the nozzle arrays in a first printing mode, the first printing mode comprising the at least two nozzle arrays printing during a pass of the print head relative to the print medium, a second one of the nozzle arrays printing with a first density masking such that a portion of nozzles of the second nozzle array are prevented from printing during the pass; and switching to printing in a second printing mode when a subsequent pass of the print head relative to the print medium does not require printing from the first nozzle array, the second printing mode comprising the second nozzle array printing without the first density masking during the subsequent pass.

In accordance with another method of the present invention, method for accelerating printing by an ink jet printing mechanism onto a print medium is provided. The ink jet printing mechanism has a print head with at least two nozzle arrays. The method comprising steps of printing with the at least two nozzle arrays during a pass of the print head relative to the print medium; advancing the print medium a first advancement distance after the pass; switching a print density filter to one of the nozzle arrays from a first percentage density filtering state to a second different percentage density filtering state for a subsequent pass of the print head relative to the print medium; and advancing the print medium a second different advance distance after the subsequent pass, the second different advancement distance being longer than the first advancement distance.

In accordance with one embodiment of the present invention, an ink jet printing apparatus is provided comprising a controller having a print density filter; a print medium advancer connected to the controller; a movable print head connected to the controller and having arrays of ink jet nozzles for printing black ink and color ink print data. The controller is programmed to scan the print data for a print head pass to be printed; if the print data includes color ink print data, apply a first setting for the print density filter to at least some of the ink jet nozzles which will print black ink data for the pass; and when the print data for the print head pass and the print data of at least one previous print head pass match a predetermined pattern, changing the setting of the print density filter for the print head pass to a second different setting.

BRIEF DESCRIPTION OF THE DRAWINGS

The foregoing aspects and other features of the present invention are explained in the following description, taken in connection with the accompanying drawings, wherein:

FIGS. 3A–B are diagrams of one method used to determine the mask settings for a data segment to be printed;

FIGS. 5A–D are charts showing a swath illustration implementing features of the present invention;

FIGS. 7A–D are charts partially showing a swath illustration implementing alternative features of the head arrangement shown in FIG. 6.

DETAILED DESCRIPTION OF THE PREFERRED EMBODIMENT

Figure 1:
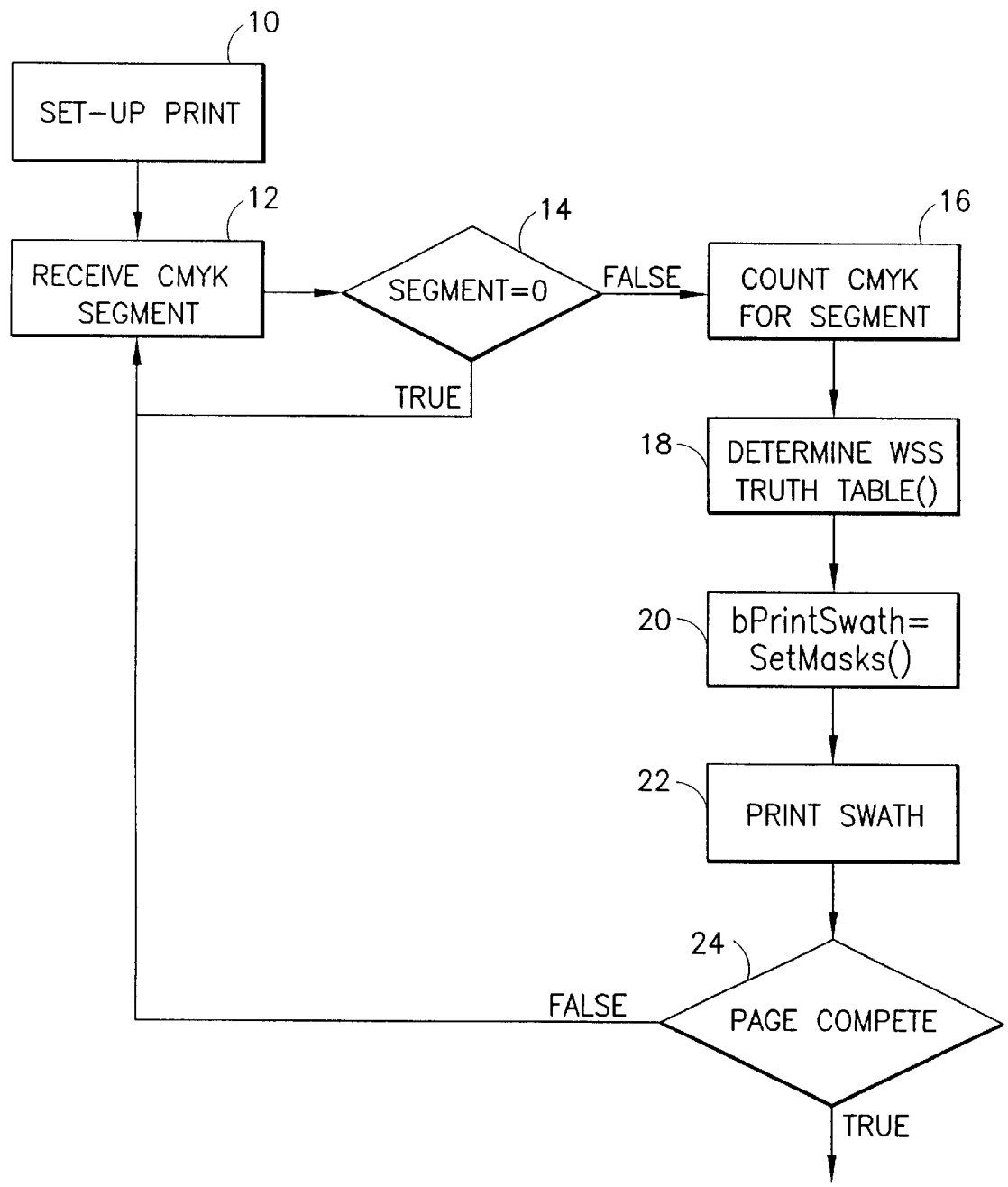
FIG. 1 is a diagram illustrating an overview of a method incorporating features of the present invention.

The present invention is generally intended to be used in an ink jet printer similar to that disclosed in U.S. Pat. No. 5,600,353 which is hereby incorporated by reference in its entirety. However, the present invention can be used in any suitable type of printing device. Referring to FIG. 1, there is shown a schematic flow diagram of one method incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The method is for use in an ink jet printer for printing a page or sheet of a print medium. Although the present invention is described with reference to an ink jet printing mechanism, the present invention can be used with any non-continuous feed. The printer first sets-up to print 10 and receives a CMYK segment 12, such as from a computer connected to the printer. CMYK corresponds to black ink (K) print data and color ink (CMY) print data (C-Cyan; M-Magenta; Y-Yellow). The controller for the printer determines at 14 if the received CMYK segment is zero. If the segment is zero, then this means that it is the first segment of a page and the method returns to block 12. If the segment is not zero then the method proceeds to count the CMYK for the segment as indicated by block 16 and proceeds to determine a white space skipping (WSS) truth table as indicated by block 18. The truth table 18 will be discussed in more detail below with reference to FIG. 2. After determining the truth table, the method proceeds to block 20 where the masks or filters (SetMask) needed to print a given mode for that data segment are determined. The SetMask will be discussed in more detail below with reference to FIG. 3. Then the method proceeds to block 22 wherein a swath is printed by the print head across the print medium and the printer advances the print medium for the next printing swath. The printer then determines if the page is complete as indicated by block 24. If the page is not complete the method proceeds back to block 12 to await receipt of another CMYK segment.

Figure 2:
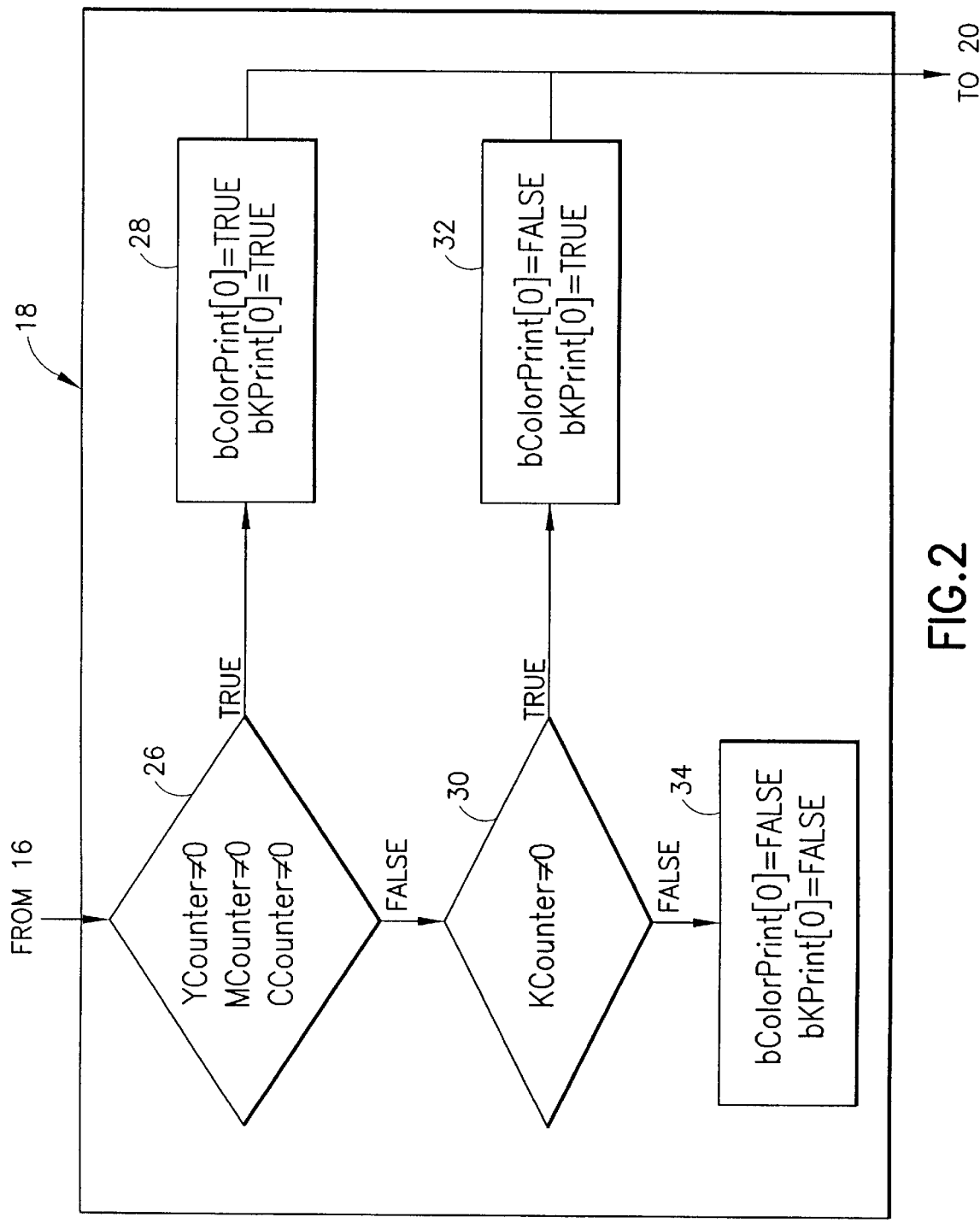
FIG. 2 is a diagram of the truth table determination used in the method shown in FIG. 1.

Referring now to FIG. 2, the truth table 18 first determines at block 26 if any of the color ink data counters (Y Counter, M Counter, C Counter) are not equal to zero. If any of the color ink data counters are not equal to zero, color ink is intended to be printed for that data segment and the truth table sets bColorPrint[0]=TRUE and bKPrint[0]=TRUE as indicated by block 28. The method then proceeds to block 20; SetMask( ). If all of the color counters are zero, the method proceeds from block 26 to block 30 to determine if the black ink data counter (KCounter) is not equal to zero. If the black ink data counter does not equal zero, black ink is intended to be printed for that data swath segment without color ink and, as indicated by block 32, the truth table sets bColorPrint[0]=FALSE and bKPrint[0]=TRUE. The method then proceeds to block 20; SetMask( ). If the black ink data counter is zero, then no black ink is intended to be printed for that segment and the method proceeds to block 34 wherein the truth table sets bColorPrint[0]=FALSE and bKPrint[0]=FALSE. The method then proceeds to block 20; SetMask ( ).

Figure 3B:
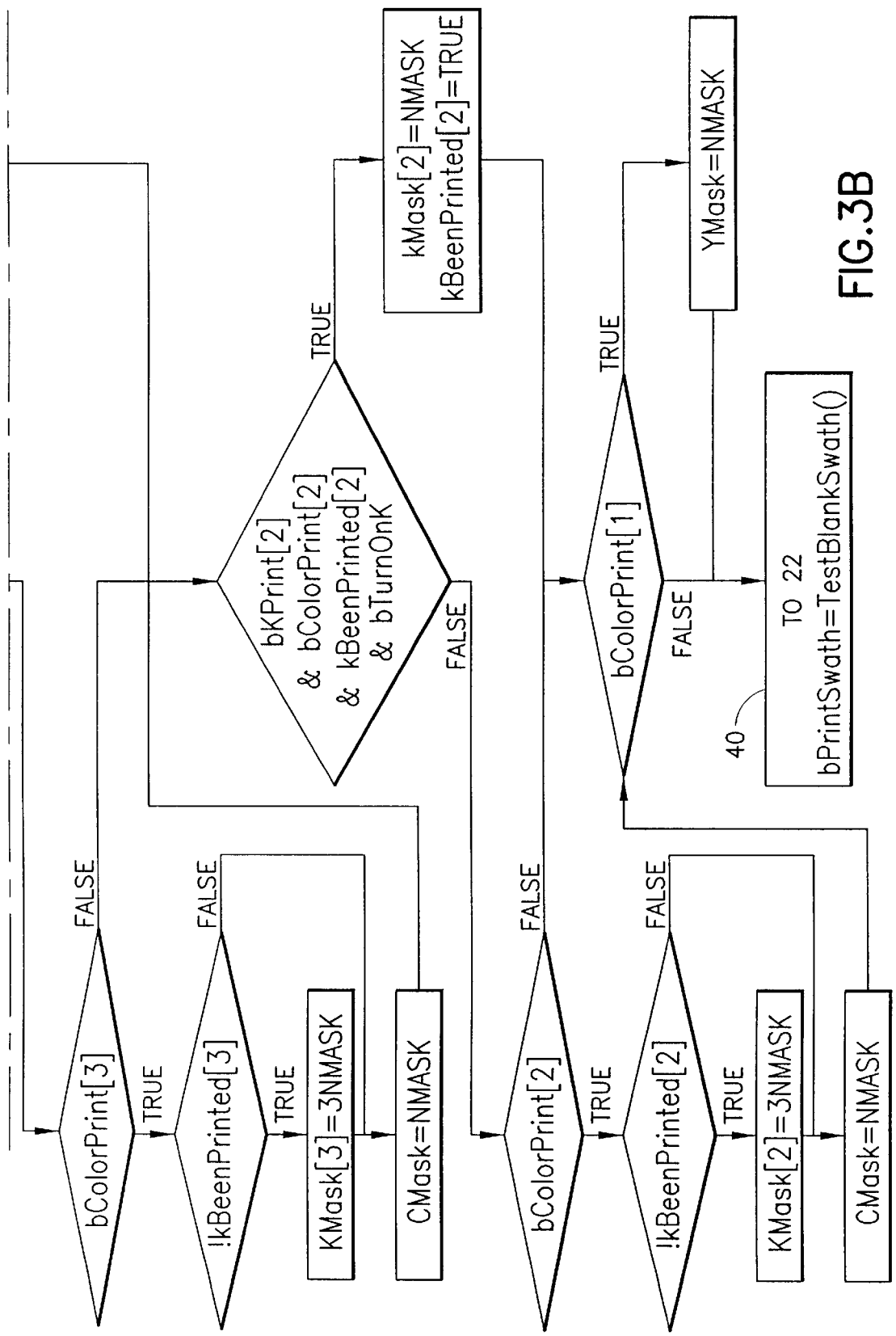

Referring now to FIG. 3 one type of method used for SetMask( ) is shown. At block 36 the SetMask( ) filter is initialized with the settings bTurnOnK=TRUE and bPrintSwath=FALSE. At block 38 all control block filters are reset. At block 40 the bPrintSwath is set to equal TestBlankSwath( ). At block 42 a first determination is made using the settings from the truth table determination 18 and whether black ink had previously been printed on that swath.

Figure 4:
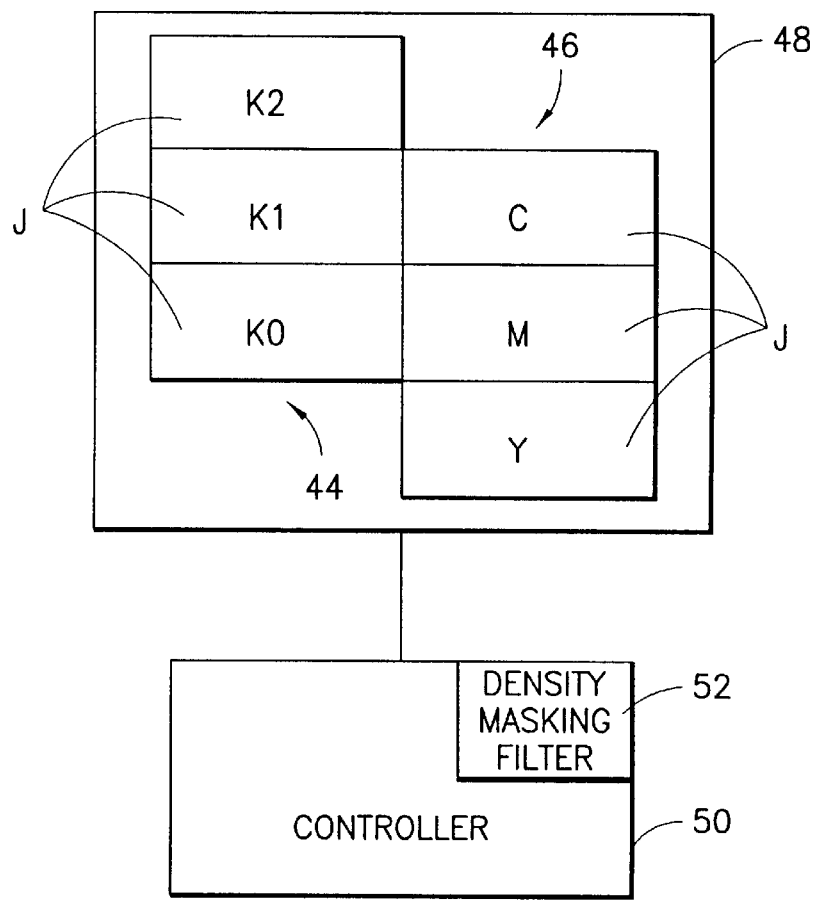
FIG. 4 is a schematic diagram of a print head and controller of a printer incorporating features of the present invention.

Referring also to FIG. 4, one schematic example of the layoff for ink jets of a print head 48 capable of printing black ink (K) and color ink (C, M, Y) is shown. The print head has a black head 1 section 44 and a color head 0 section 46. In a preferred embodiment the black head section 44 has three sub-arrays J (K0, K1, K2) of jet nozzles and 312 jets (104 jets per sub-array J), but any suitable sub-arrays and number of jets could be provided. Also in a preferred embodiment the color head section 46 has three sub-arrays J (C, M, Y) of jet nozzles; one for each color ink and 104 jets per sub-array. However, any suitable sub-arrays and number of jets could be provided. The number of jets in each color control segment that are fired is preferably equal to that of each black control segment that are fired. Thus, when one sub-array of jet nozzles of color ink fire an adjacent sub-array of jet nozzles of black ink will preferably fire an equal number of its jet nozzles. However, this can also be varied if desired. The leading edge of the nozzles of the black and color arrays of nozzles are offset at least one sub-array from each other. In this layout the print head is intended to print in one pass and then advance relative with the print medium. As is known in the art, the nozzles are connected to the printer's controller 50 and are separately addressable. The nozzles are separately addressable through a masking filter 52. The masking filter can address each of the control segments K0, K1, K2, C, M, Y as groups and can be set to MASK0, MASK100, or MASK33. MASK0 is when masking is OFF and none of the nozzles of that control segment are to be allowed to print for that swath pass. MASK0 is also described as ZeroMask herein. MASK33 is when masking is partially ON and only ⅓ or 33% of the nozzles of that segment are to be allowed to print for that swath pass. MASK33 is also described as 3NMask herein. MASK100 is when masking is ON and 100% of the nozzles of that control segment are to be allowed to print for that swath pass. MASK100 is also described as NMask herein. In alternate embodiments any suitable density masking percentages could be provided for each sub-array J.

Referring now to FIG. 5, shown in the four continuous FIGS. 5A, 5B, 5C, and 5D, a swath illustration is shown implementing features of the present invention. Preferably, the actual algorithm prevents using yellow at 100% and black at 100% followed by a next swath of 100% as shown in the drawings. In passes 1–8 both color and black ink are intended to be printed. In passes 9–11 only black ink is intended to be printed. In passes 12–19 both color and black ink are intended to be printed. Thus, transitions occur between passes 8 and 9 and passes 11 and 12. In passes 1–8 the printer prints with a first printing mode comprising a 3NMask to the black ink segments K0, K1, K2 and MASK100 to the color ink segments C, M, Y. Thus, for the pass 1, Y will be able to print with 100% of its nozzles along segment swath 1. At the end of the first pass the print medium is advanced relative to the print head a first advancement distance equal to a segment J (104 nozzles). With bi-directional travel of the print head for pass 2, the print head will then be able to print Y with 100% of its nozzles along segment swath 2, and will be able to print K0 at 33% and M at 100% along segment swath 1. In FIGS. 5A and 5B, 0 represents MASK0, 100 represents MASK 100, 33_0 represents MASK33 (first segment pass), 33_1 represents MASK33 (second segment pass), and 33_2 represents MASK33 (third segment pass). The stepwise progression of the head advancement and printing shown in FIGS. 5A and 5B should be understood by a person skilled in the art. When the print head comes to passes 7 and 8, the K0 and the K0 and K1 segments, respectively, are subjected to a MASK0 such that, when the print head moves to pass 9 all the block segments K0, K1, K2 can be allowed to print at MASK100 with 100% of their nozzles active for a second printing mode. Moving between pass 9 and pass 10 the relative advancement of the print medium to the print head can be advance the entire length of the black head 0 section 44 of 312 jets rather than merely 104 jets. The same is true between passes 10 and 11. However, between passes 11 and 12 the relative advancement is only 208 jets (equivalent to two J segments) because color printing will resume at swath segment 17. Therefore, MASK33 printing for black ink should start at swath segment 16. Thus, at pass 12, K0 is able to print with MASK33, K1 is able to print with MASK100, and Y is able to print with MASK100.

Referring back to FIG. 3, "!" is a "not" operator and "&"is a Boolean "and" operator. The method has the controller use an algorithm using the method of FIG. 3 to set the masking/filters for the various head control segments J. The terminology used in FIG. 3 generally corresponds to the following:

bKPrint—begin black ink print flag of truth table if black is to print
bColorPrint—begin color ink print flag of truth table if color is to print
KBeenPrinted—black ink has been printed
KMask—black ink mask setting
bTurnOnK—black ink setting turned ON flag
CMask—Cyan ink mask setting
MMask—Magenta ink mask setting
YMask—Yellow ink mask setting and the numbers in the brackets ([ ]) represent different memory locations representing the segment; "[4]" for partial black ink determination only and "[3]", "[2]", and "[1]" for color ink and black ink determination.

Figure 6:
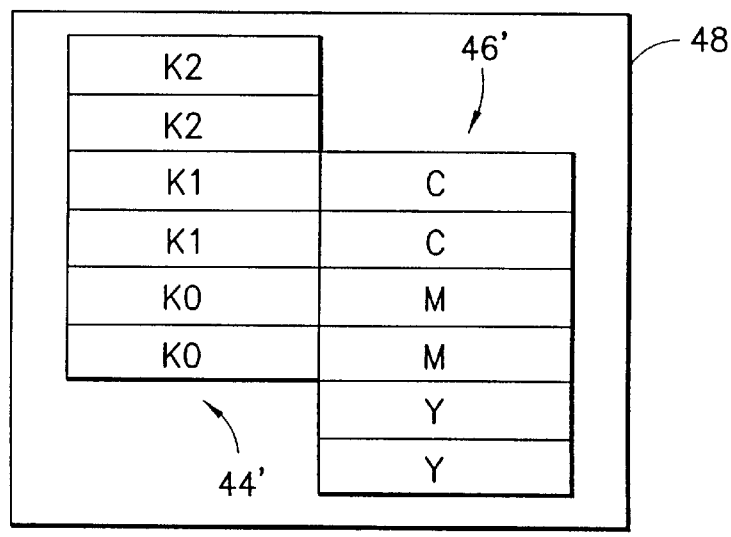
FIG. 6 is a schematic illustration of the print head shown in FIG. 4 with its segments arranged for a two pass printing method.
Figure 7B:
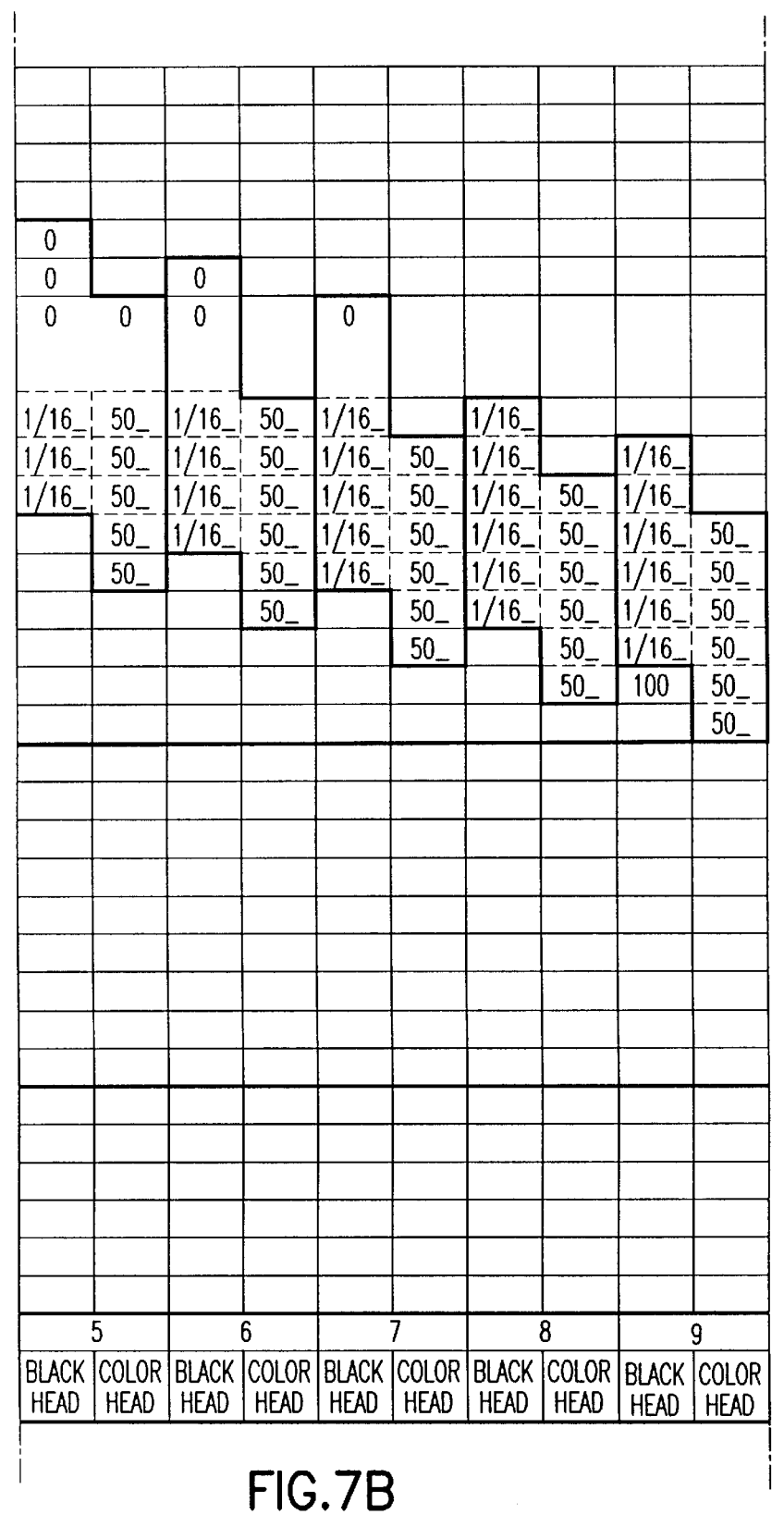
Figure 7D:
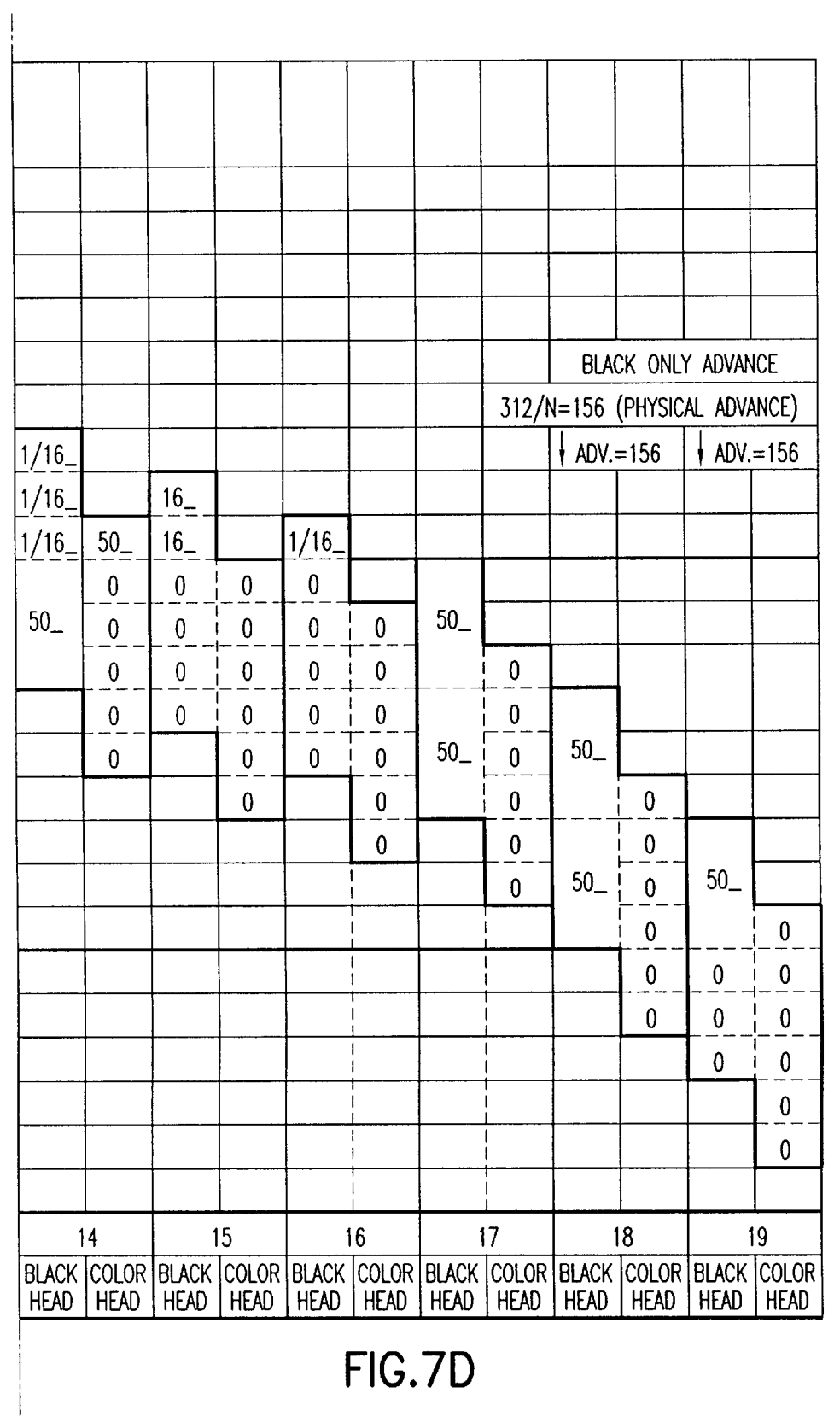
Figure 8A:
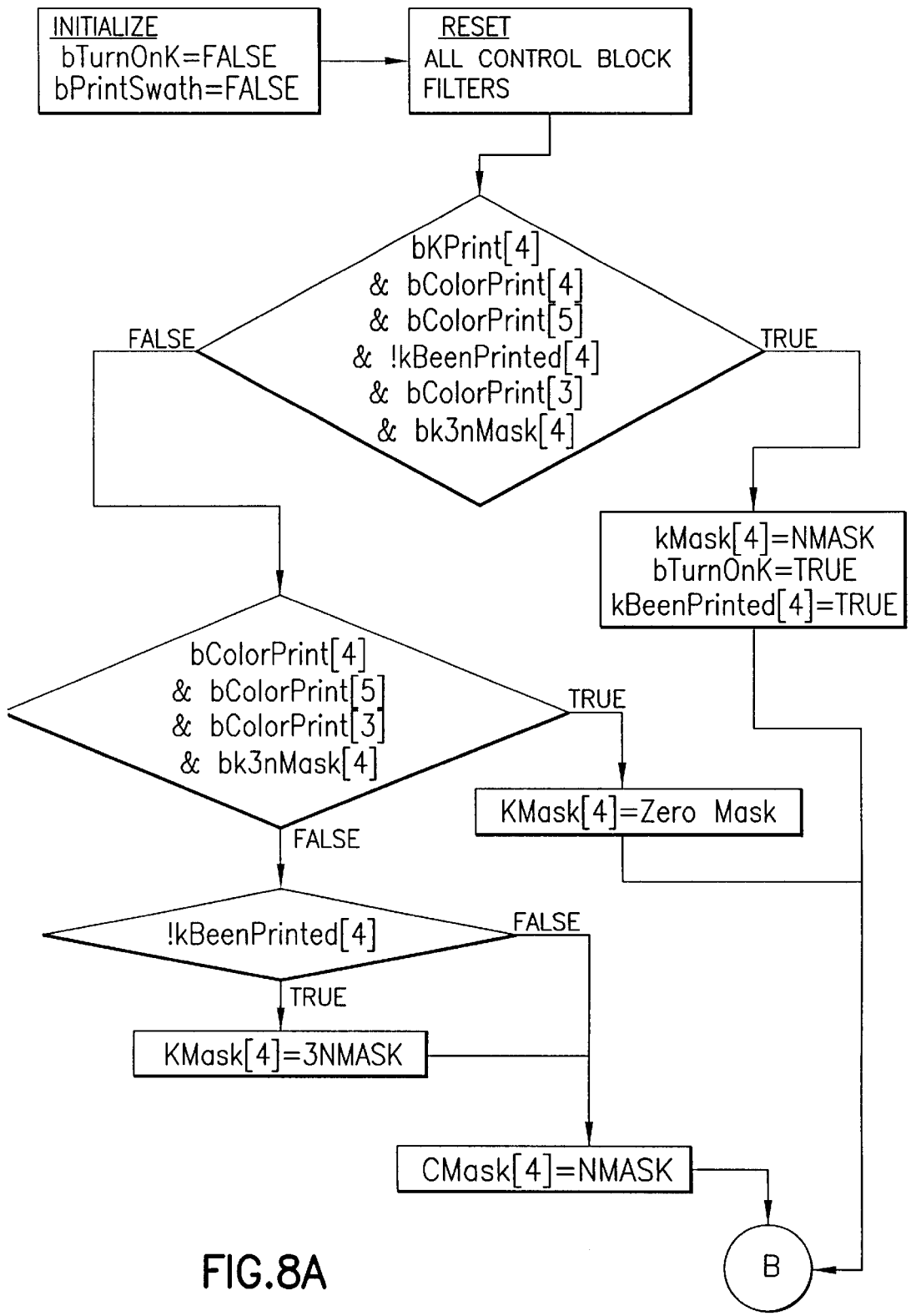
FIGS. 8A–B, C-1, & C-2 are flow diagrams of another method used to determine the mask settings for a data segment to be printed.
Figure 8B:
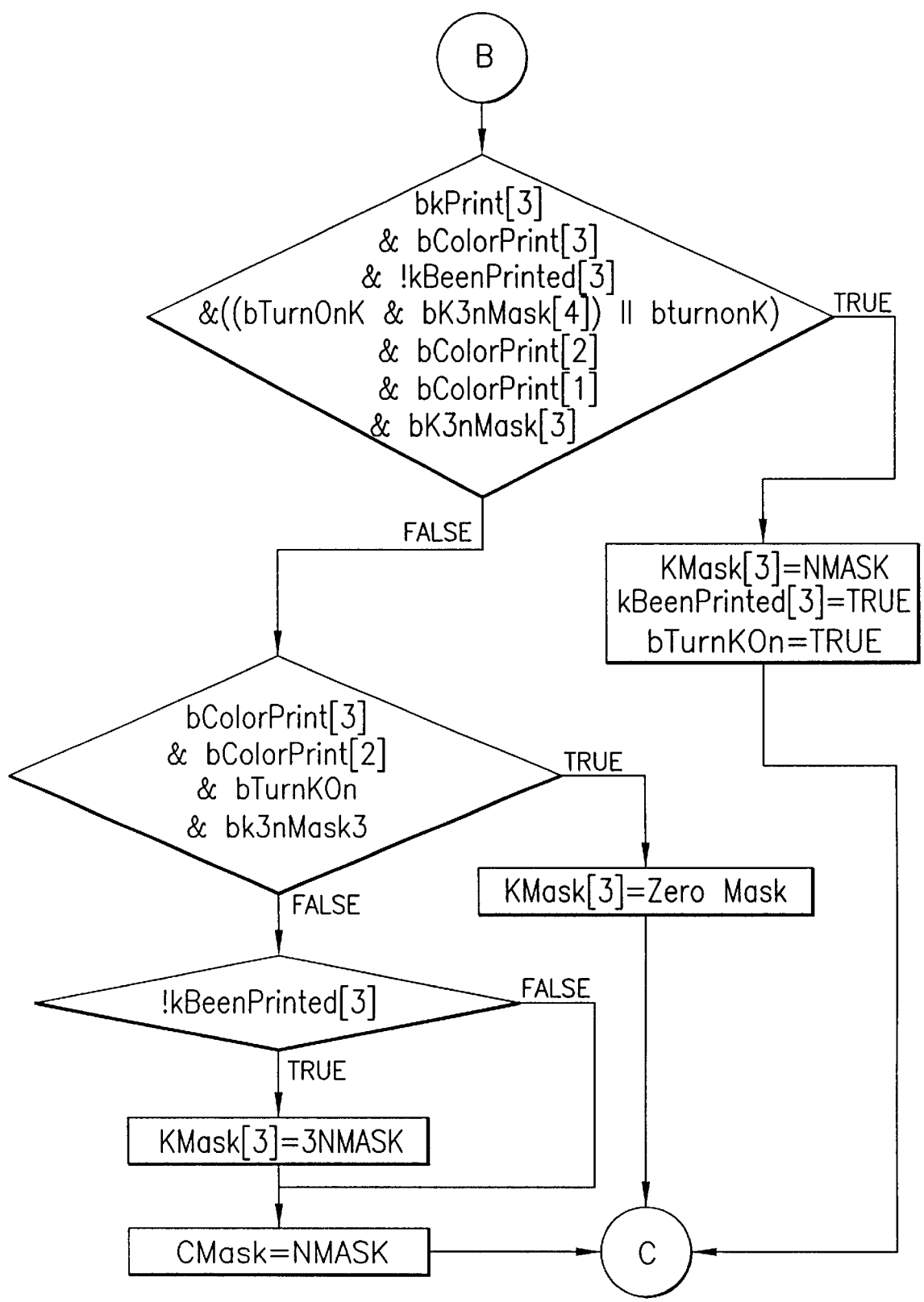
Figures 2, 8C:
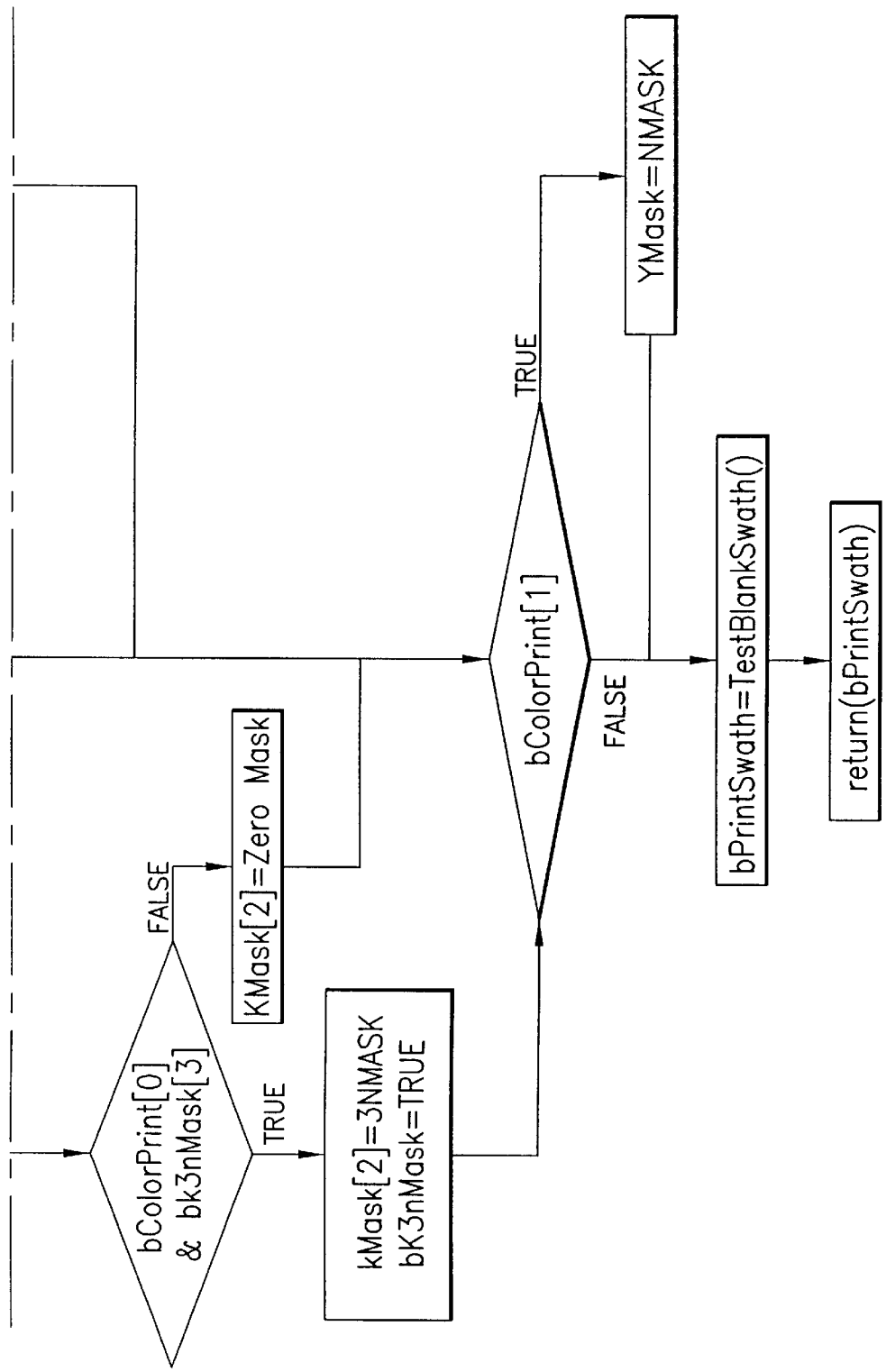

Referring now to FIG. 6 the same print head 48 is shown with an alternate embodiment of a head arrangement masking segment control for a two pass color (50% per pass) and 6 pass black (16.67% per pass). Process head advancement for the first printing mode of color and black would be "52"; J/N where J=104 jets and N=2 passes. FIG. 7, shown in the four continuous FIGS. 7A, 7B, 7C, and 7D partially illustrate an example using this head control segment printing. FIGS. 8A–8C schematically illustrate an alternate method which can be used to set the masks. The algorithm would generally comprise the following wherein portions of the lines of code following the term "//" are comments:

```
int SetMasks()

(
    int j;
    int bTurnKOn = FALSE;
    int bPrintSwath = TRUE;
    int bColorToPrint = FALSE;       // is color in the
                                        head to print
    int bBlackToPrint = FALSE;       // is Black in the
                                        head to print
    int nSetColorMaskTo;
    int nSetBlackMaskTo;
    for (j = 1; j < 5; j++)
        Yprint[j] = CPrint [j] = MPrint [j] = KPrint [j] = mask0;
// original segmented code
// if (bColorPrint [0] && bKPrint [0]) // color & black
together
// (
//determine if previous 3 segments are 100% K. If so,
print them now and set the print register
//******************Is the last segment K2
    if (bKPrint [4] && !bColorPrint [4]       //only black to be
                                                printed
        && !bColorPrint [5]              //Not at a back transition
                                            (print back next to yellow)
        && !kBeenPrinted [4]             //has the this segment been
                                            printed.
        && !bColorPrint [3]              //not at a lead transition
        && !bK3nMask [4])                //not a 3NMask
    (
        KPrint [4] = mask100;
        bTurnKOn = TRUE;
        kBeenPrinted [4] = TRUE
    )
    else if (!bColorPrint [4]        // No color in this segment
        && !bColorPrint [5]          // No color in later
                                        segment
        && !bColorPrint [3]          // No color in K1 segment
        && !bK3nMask [4])            // not a 3NMask already
    (
        Kprint [4] = mask0;
    )
    else // (bColorPrint [4] || bColorPrint [5] ||
                                bColorPrint [3])
    (
        if (!kBeenPrinted [4])
        (
            Kprint [4] = mask33;
        )
        Cprint [4] = mask100
    )
//********************is the MIDDLE segment k1
    if (bKPrint [3] && !bColorPrint [3] // only black in
                                            this segment
        && !kBeenPrinted [3]             // this segment has not
                                            been printed
        && ((!bTurnKOn && !bK3nMask [4]) || bTurnKOn)
                                        // turns on for the start
                                            of a mode switch or we are
                                            in the middle of a K block
        && !bColorPrint [2]              // not at a transition
        && !bColorPrint [1]              // not an isolated 100%
        && !bK3nMask [3])                // not a 3n Mask
    (
        Kprint [3] = mask100;
        kBeenPrinted [3] = TRUE;
        bTurnKOn = TRUE,
    )
    else if ( !bColorPrint [3]       // No color in this segment
        && !bColorPrint [2]          // Not at a transition
        && !bTurnKOn                 // not in a mode switch
```

```
-continued int SetMasks()

&& !bK3nMask [3])                // not in a 3n mask
    (
        Kprint [3] = mask0;
    )
    else // (bColorPrint [3] || bColorPrint [4] ||
            bColorPrint [2])
    (
        if (!kBeenPrinted [3]) Kprint [3] = mask33;
        CPrint [3] = mask100;
        MPrint [3] = mask100;
    )
//************this is the FIRST segment K0
    if (bKPrint [2] && !bColorPrint [2]
                                        // Only black in this
                                            segment
        && Kprint [3] == mask100         // And Middle Segment is
                                            100%
        && !bColorPrint [3]              // No color in middle
                                            segment
        && !kBeenPrinted [2] && bTurnKOn
                                        // This segment has not
                                            been printed
        && !bColorPrint [1])             // not at a transition
    (
        Kprint [2] = mask100;
        kBeenPrinted [2] = TRUE;
    )
    else if (!bColorPrint [3]        // no color in the middle
                                        segment (transition out)
        && !bColorPrint [2]          // No Color in this segment
        && !bColorPrint [1]          // Not at a transition
                                        (transition in)
        && !bTurnKOn)                // Not in mode switch
    (
    // prevent from using too many control blocks
    if (bColorPrint [0]              // new buffer has color
        &&bK3nMask [3])              // The middle black has
                                        color
    (
        KPrint [2] = mask33;
        bK3nMask [2] = TRUE;
    )
    else
        KPrint [2] = mask0;
    )
    else //if (bColorPrint [2] || bColorPrint [3] ||
                                bColorPrint [1])
    (
        KPrint [2] = mask33;
        bK3nMask [2] = TRUE;
        MPrint [2] = mask100;
        YPrint [2] = mask100;
    )
//*******************Yellow segment
    if (bColorPrint [1])
        YPrint [1] = mask100;
    // determine if we can skip the swath all together
    if (KPrint [4] + KPrint [3] + KPrint [2] + YPrint [1] +
        MPrint [2] + MPrint [3] + CPrint [3] + CPrint [4] = 0)
        bPrintSwath = FALSE;
    return (bPrintSwath);
```

The invention described herein is a technique to improve the productivity of Ink Jet Printing. The productivity gain is realized by the invention by switching printing modes between a N-Pass Color and 3N-Pass Black printing mode to a N Pass black mode if only black data exists within a region of the page. Additionally, in any regions which contain no image data, the print head will not attempt to scan across it as if it were being printed, instead only the paper is advanced over these regions. This can produce up to a 3× savings in print time if the page is predominantly monochrome.

This invention details the increased performance of an Ink Jet Printing Device through use of Auto Mode Switching and White Space Skipping Algorithms. If one were to print a page with ink jet technology, several steps would take place in the printer, once a host has prepared the page for printing. FIG. 1, gives an overview of the printing process which includes the invention. Once a host starts to print a page, the Ink jet printing device sets-up the state of the machine. It receives the first segment of the page to be printed and stores it in a buffer. (A data segment, is a set of rasters, any combination of colors and black, that equals the paper advance.) Once the first segment is buffered, the printer continues printing the page using a process which consists of the following steps:

1) Counting the number of pixels of color and black in a data segment;
2) Determine a truth table denoting if Color and Black exists within a data segment;
3) Setting up the masks of filters needed to print a given mode while determining if a swath needs to be printed;
4) Printing the swath & advancing the paper; and
5) Repeat steps 1 to 4 until the end of the page is reached.

The invention includes in step 3, the setting up of the printing masks and determining if the swath needs to be printed. However, this relies on the creation of a truth table for each data segment. FIG. 2 details the logic in determining the truth tables from pixel counters. Lastly the Truth tables are used for all data segments of the print head to selectively determine what mask or filter is to be used. One example of the rules for this are in FIG. 3.

In alternate embodiments any suitable density masking can be provided so long as the combined sum of ink is 100%, such as ½ for two passes, ⅓ for three passes, ⅕ for five passes, ⅐ for seven passes, etc. In a preferred embodiment the first nozzle array is for tricolor ink, the second nozzle array is for black ink, the second array has at least twice as many jets as the first array, the second array can use at least twice as many jets as present in the first array during black ink only printing, and the second array can use at least half (or less than half) the number of jets present in or being used by the first array during color ink and black ink printing. The algorithms described above and the processes shown in the drawings are only intended to be examples of the present invention. Different programming and/or structures could be used to obtain the same result. The steps of the methods could also be varied or be reorganized in different sequences or with additional steps added.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of printing on a print medium with a printing mechanism having a print head with at least two nozzle arrays comprising steps of:
   printing with the nozzle arrays in a first printing mode, the first printing mode comprising the at least two nozzle arrays printing during a pass of the print head relative to the print medium, a second one of the nozzle arrays printing with a first density masking such that a portion of nozzles of the second nozzle array are prevented from printing during the pass;
   determining if a subsequent pass of the print head relative to the print medium requires printing from the first nozzle array; and
   switching to printing in a second printing mode based upon a determination that the subsequent pass of the print head relative to the print medium does not require printing from the first nozzle array, the second printing mode comprising the second nozzle array printing without the first density masking during the subsequent pass.

2. A method as in claim 1 wherein the at least two nozzle arrays each have at least three nozzle head segments, wherein the density masking of the second nozzle array in the first printing mode is about at least 33%, and wherein the second nozzle array prints black ink onto the print medium.

3. A method as in claim 2 wherein a first one of the nozzle arrays prints color ink onto the print medium.

4. A method as in claim 3 wherein the first nozzle array does not have density masking during printing in the first printing mode.

5. A method as in claim 3 wherein during printing in the first printing mode the density masking of the second nozzle array is about 16.7% and the first nozzle array has density masking of about 50%.

6. A method as in claim 1 further comprising the printing mechanism advancing the print medium relative to the print head after the pass in the first printing mode a first advancement distance and a second longer advancement distance after the pass in the second printing mode.

7. A method as in claim 6 further comprising advancing the print medium relative to the print head without passing the print head across the print medium when printing by the print head is not required along a swath path.

8. A method as in claim 1 further comprising switching from printing in the second printing mode back to printing in the first printing mode.

9. A method as in claim 1 wherein switching from the first printing mode to the second printing mode only occurs if a first one of the nozzle arrays does not print during an immediately prior swath path of the print head relative to the print medium.

10. A method as in claim 1 wherein the at least two nozzle arrays each have more than three nozzle head segments, and the method further comprises a third printing mode between the first and second printing modes which comprises some of the head segments of the second nozzle array printing with the first density masking and some of the head segments of the second nozzle array printing with a second different density masking.

11. A method as in claim 10 wherein switching from the first printing mode to the third printing mode only occurs if a majority of the nozzle head segments of a first one of the nozzle arrays does not print during an immediately prior swath path of the print head relative to the print medium.

12. A method for accelerating printing by a printing mechanism onto a print medium, the printing mechanism having a print head with at least two nozzle arrays, the method comprising steps of:
   printing with the at least two nozzle arrays during a pass of the print head relative to the print medium;
   advancing the print medium a first advancement distance after the pass;
   switching a print density filter to one of the nozzle arrays from a first percentage density filtering state to a second different percentage density filtering state for a subsequent pass of the print head relative to the print medium; and
   advancing the print medium a second different advance distance after the subsequent pass, the second different advancement distance being longer than the first advancement distance.

13. A method as in claim 12 wherein the first percentage density filtering state is about 33%.

14. A method as in claim 13 wherein the second different percentage density filtering state is about zero percent.

15. A method as in claim 12 wherein the at least two nozzle arrays each have at least two head segments (HS) and wherein the first percentage density filtering state is about 1/HS.

16. A method as in claim 12 wherein the at least two nozzle arrays each have multiple head segments, and wherein different ones of the head segments of the one of the nozzle arrays have different density filtering states during the pass.

17. A method as in claim 12 further comprising advancing the print medium without passing the print head across the print medium when printing by the print head is not required along a swath path.

18. A method as in claim 12 further comprising, substantially immediately after the step of advancing the print medium the second different advance distance, printing on the print medium during the subsequent pass of the switched density filtering state nozzle array with the second different percentage density filtering state.

19. A method as in claim 18 further comprising not printing with one of the other at least two nozzle arrays during the subsequent pass.

20. A method as in claim 12 wherein the subsequent pass is along an area of the print medium contiguous to an area of the print medium previously printed on during the step of printing.

21. A method as in claim 12 wherein the step of switching is automatic based, at least partially, upon a type of image to be printed during the subsequent pass.

22. An ink jet printing apparatus comprising:
   a controller having a print density filter;
   a print medium advancer connected to the controller;
   a movable print head connected to the controller and having arrays of ink jet nozzles for printing black ink and color ink print data;
   wherein the controller is programmed to:
      a) scan the print data for a print head pass to be printed;
      b) if the print data includes color ink print data, apply a first setting for the print density filter to at least some of the ink jet nozzles which will print black ink data for the pass; and
      c) when the print data for the print head pass and the print data of at least one previous print head pass match a predetermined pattern, changing the setting of the print density filter for the print head pass to a second different setting.

* * * * *